United States Patent [19]

Dumas

[11] Patent Number: 4,981,733

[45] Date of Patent: Jan. 1, 1991

[54] CRYSTAL CONTAINER TREATED TO IMPEDE THE MIGRATION OF LEAD TO THE CONTAINER'S CONTENTS

[75] Inventor: Jean Dumas, Saint Die, France

[73] Assignee: Compagnie des Cristalleries de Baccarat, Baccarat, France

[21] Appl. No.: 174,918

[22] Filed: Mar. 29, 1988

[30] Foreign Application Priority Data

Feb. 29, 1988 [FR] France ................................ 88 02668

[51] Int. Cl.⁵ ............................................. B32B 17/06
[52] U.S. Cl. .................................. 428/34.6; 428/34.4; 428/428; 428/701
[58] Field of Search ...................... 428/34.4, 34.6, 428, 428/701

[56] References Cited

U.S. PATENT DOCUMENTS

| | | | |
|---|---|---|---|
| 3,463,624 | 6/1967 | Labino | 428/13 |
| 4,289,816 | 9/1981 | Fogelberg et al. | 428/34.6 |
| 4,312,951 | 1/1982 | Eppler | 428/432 |
| 4,316,963 | 2/1982 | Hommel et al. | 428/428 |
| 4,340,645 | 8/1982 | O'Conor | 428/428 |
| 4,595,614 | 8/1986 | Nunlist | 428/34.6 |

*Primary Examiner*—Ellis P. Robinson
*Assistant Examiner*—Archene Turner
*Attorney, Agent, or Firm*—Morgan & Finnegan

[57] ABSTRACT

Container made of crystal for containing any product and drink with acid characteristics, characterized in that in order to prevent the lead from migrating from the crystal to the said products and drinks, the said container has on its internal surface a thin and continuous film made of unleaded glass forming a "screen".

3 Claims, No Drawings

CRYSTAL CONTAINER TREATED TO IMPEDE THE MIGRATION OF LEAD TO THE CONTAINER'S CONTENTS

BACKGROUND OF THE INVENTION

This invention concerns in general containers made of crystal for containing food products or drinks and especially, but without being a restriction, for spirits.

It is well known there is a tendency for any liquid being in a container to dissolve out some proportion of the elements constituting the container, wherever its material. Of course, it is in general a very low proportion, for example water contained in ordinary glass leaches out a proportion of $Na^2O$ contained in this glass. A normalized test (DIN 1211) allows to compare the hydraulic resistance of glasses containing sodium and calcium (dissolution of 30 to 1000 $\mu g$ $Na^2O$ per gr of glass reduced to powder, being in water of a temperature of 90° C. during one hour).

This general phenomenon is to be taken into consideration in analytic chemistry and also in some divisions of high top chemistry, but not in general in everyday life, except in very particular cases as with certain heavy metals like cadmium and lead where the tendency for migration in materials used for kitchen utensils or when they're coming into contact with liquid is well known. More particularly, crystal contains lead Monoxide (AFNOR Norm: NF 30004) and it has been noted that quantities, which can reach some ppm, can migrate towards acid liquids (pH about 3,5) conserved during quite a long time in container made of crystal.

Moreover, this phenomenon was the object of elaborate studies leading to the elaboration of control norms in order to "make sure the people are protected against the possible dangers caused by a contact of the food products with the surface of goods made of glass and employed for the preparation, service and conservation of food and drinks" (INTERNATIONAL NORM ISO 7086/1-1982).

SUMMARY OF THE INVENTION

The invention has for its object to eliminate such a disadvantage with a new industrial product comprising a container such as a bottle, essentially made of crystal and having a "screen" made of neutral unleaded glass located between the crystal surface and its contents. Of course, such a "screen has to be very thin, only a few microns, but sufficient to avoid all migration.

The invention has for its further objects to provide a process for making such a container, and more particularly a bottle, process which guarantees the presence, on the internal face of the bottle, of a very thin film of neutral glass closely bound with the surface of crystal.

Such a process is substantially characterized by the fact that a small amount of unleaded glass, compatible with crystal, is gathered and "drained" in order to make it even smaller, and beetled in order to give it a drop-shape without concavity, before gathering the crystal with an usual blowing cane.

After reheating, the parison of crystal is gathered and it covers the drop of unleaded glass when adhering without embedding any air, and then the piece is blown in the usual way. At this time, the small quantity of unleaded glass being under the crystal at the extremity of the cane is strongly distended and covers the whole internal face of the piece with a very thin film, protecting its contents against the direct contact of the crystal and consequently against pollution due to lead.

Of course, the glass used for making this film-screen has to be an unleaded glass having physical characteristics close to the characteristics of the crystal, particularly the same coefficient of expansion in order to avoid any fissure in the film during cooling or reheating, and the same index of refraction in order to conserve the brilliancy of the piece. The piece can, naturally be cut in usual way; it means the film-screen cannot be seen and the piece keeps its external aspect.

Of course, the foresaid example is not to be considered as a limitation for the application of the invention, which can have many other modifications. For example, the objects of the invention are not only bottles for containing alcoholic drinks for a long time, but also any kind of containers made of crystal provided to contain any kind of food products for which the protection is required against lead pollution.

The application of the invention makes it possible to offer the consumer bottles which conserve all the artistic quality of the crystal, and can be guaranted against any migration from the crystal to liquid.

I claim:

1. A crystal container comprising a lead containing crystal body and a very thin continuous film of unleaded glass bonded to the whole internal surface of the container body for preventing the migration of lead from the container body to its contents, said film having close to the same coefficient of expansion and index of refraction as the lead containing crystal body.

2. Container according to claim 1 characterized in that said container comprises a bottle for containing cognac or other alcoholic drinks.

3. A crystal container as recited in claim 1 which is formed by the process comprising the steps of gathering a predetermined quantity of unleaded glass having a drop shape; gathering a parison of crystal over the unleaded glass so as to cover said unleaded glass, and blowing said parison of crystal and covered unleaded glass together to a desired configuration, the unleaded glass becoming distended by the blowing.

* * * * *